United States Patent Office 3,396,331
Patented Aug. 6, 1968

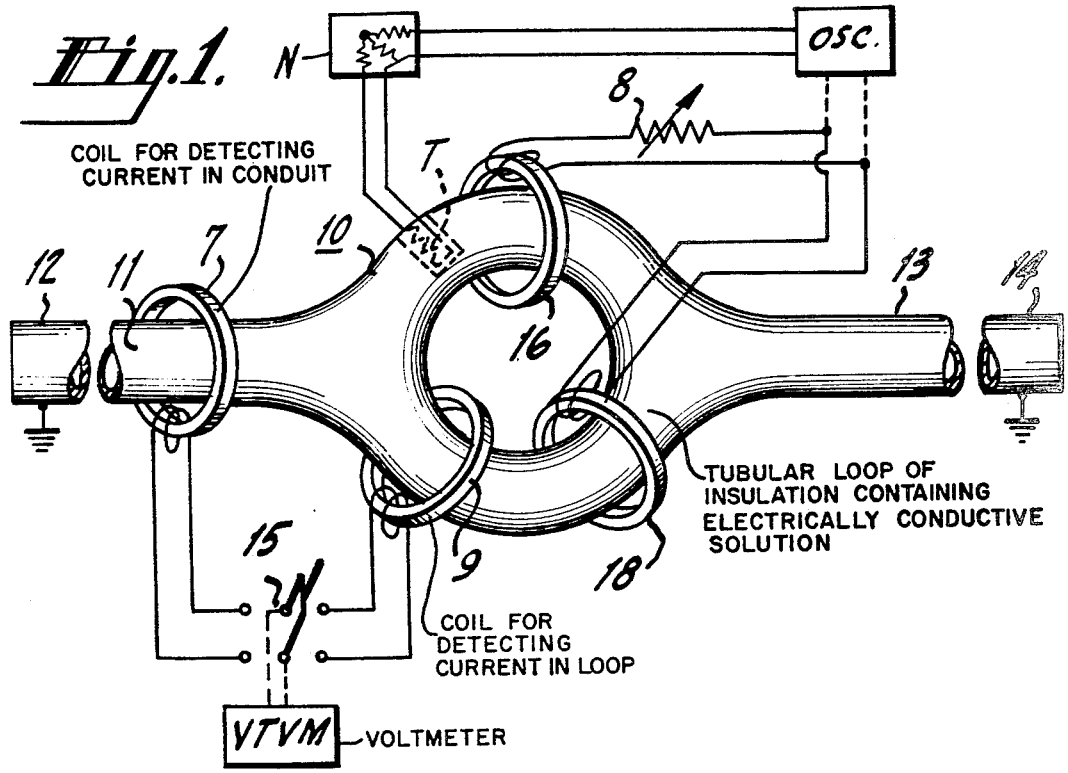
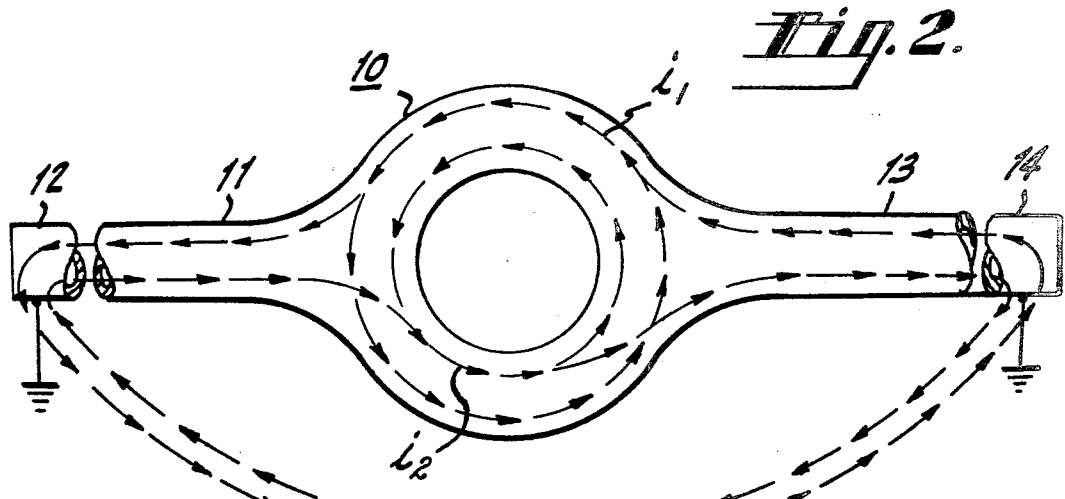

3,396,331
METHOD OF AND APPARATUS FOR MEASURING THE ELECTRICAL CONDUCTIVITY OF A SOLUTION
Elmer A. Sperry III, Pompton Plains, N.J., assignor, by mesne assignments, to Beckman Instruments, Inc., Fullerton, Calif., a corporation of California
Filed Aug. 19, 1965, Ser. No. 480,857
8 Claims. (Cl. 324—30)

ABSTRACT OF THE DISCLOSURE

A method of and apparatus for determining the conductivity of an electrically conducting fluid, mud, slurry, oil and mixtures thereof with or without solids which utilizes a tubular closed loop containing the material to be measured, an alternating current input source coupled to a pair of spaced toroidal coils surrounding different portions of the loop, and means for measuring the flow of induced current in the material contained in the loop.

This invention relates to a method of and apparatus for measuring the electrical conductivity of a conducting medium which is capable of flowing, such as an electrolyte solution, slurries, sludges, and the like.

It is known to measure the conductivity of an electrolyte by means of a pair of toroidal cores immersed in a solution. Certain problems involving stray leakage arise when the cores are physically immersed in the solution. It has also been known in the past to employ two spaced electrodes immersed in the solution for measuring conductivity, but such an arrangement suffers from other disadvantages including the polarization of the electrodes while in use. United States Patent No. 2,542,057 granted Feb. 20, 1951, to M. J. Relis, proposes to overcome the foregoing difficulties by the use of means in the pick-up circuit for compensating for the inductive effect of the stray field from the current setting up means.

The present invention is a simplified, relatively inexpensive and improved electrodeless system for measuring the electrical conductivity of a conducting medium and which eliminates the need for immersing the toroidal cores or electrodes within the electrolyte or solution under investigation. Further, the present invention makes use of a system of minimum components and wiring complexity to achieve a highly efficient and accurate measurement of the electrical conductivity of the conducting medium being tested or investigated. Still further, the present invention makes use of a tubular loop construction through which flows the solution to be investigated, and an important feature of the invention is the use of circuitry for completely eliminating all leakage current to ground.

The tubular loop construction of the invention through which a sample of the conducting solution is passed is closed on itself. This loop is in the form of a double Y section which is electrically insulated from the material of the solution under study and from the grounded inlet and outlet conductive pipes. A pair of input toroidal coils surround oppositely disposed regions of the loop for inducing a flow of alternating current in the solution within the loop. Because of the practical difficulty of making a double Y section with exactly equal arm resistances, an adjustable balance control is provided to equalize the arm resistances. The solution is introduced into the loop at a point between the two toroidal coils and the solution is withdrawn from the loop at another point oppositely disposed relative to the toroidal coils though also positioned between the two coils. The arrangement is such that the current induced in the solution by one of the input toroidal coils and flowing in the inlet and outlet conduits as leakage currents cancels the current induced in the solution by the other input coil and which also flows in these same inlet and outlet conduits.

Brief description of the drawing

A more detailed description of the invention follows in conjunction with a drawing, wherein:

FIG. 1 illustrates in perspective an embodiment of the present invention utilizing a loop containing the material to be measured, and FIG. 2 illustrates the relative directions of current flow induced in the solution by the input driver toroidal coils and flowing in the loop and in the inlet and outlet conduits of the embodiment of FIG. 1.

Detailed description of the invention

The appartus illustrated in FIG. 1 for measuring the electrical conductivity of a solution comprises a tubular loop or dough-nut construction 10 which is closed on itself and through which passes the solution to be investigated. This closed loop 10 is electrically insulated from the solution under study and may consist of Teflon or polyvinyl chloride tubing in the form of a double Y section suitably joined to form the loop. Branch circuits or conduits 11 and 13 of the same material as the closed loop and integral therewith introduce the solution into and withdraw the solution from the loop, or vice versa, and are coupled to and communicate with grounded metallic pipes 12 and 14.

Surrounding different regions of the closed loop are a pair of driver or input energizing toroidal coils 16 and 18 positioned so that the inlet and outlet conduits 11 and 13 are located between them but on opposite sides thereof, as shown. Both input coils 16 and 18 are excited by current from a highly stable alternating current source OSC which supplies currents of stable frequency and amplitude. By way of example only, a battery-operated transistorized Hartley oscillator and amplifier may be used which supplies to the driver coils 16 and 18 a frequency in the range of 60 to 18,000 c.p.s. of a voltage around 10 volts and less, but preferably not exceeding 15 volts. A toroidal coil 7 is positioned around one of the conduits, let us say 11, between the grounded connection and the loop. A pick-up toroidal coil 9 is positioned around a region of the loop 10 for responding to the flow of alternating current in the loop solution and for generating a voltage in proportion to the conductivity of the solution. Both toroidal coils 7 and 9 are respectively connected to oppositely disposed contacts of a double-pole double-throw (DPDT) switch 15. The central pair of contacts of switch 15 are coupled to a vacuum tube voltmeter VTVM. A balance control in the form of a variable resistor 8 in the connection between one of the input or driver toroidal coils, in this case 16, and the oscillator OSC serves to adjust the amount of energy supplied to coil 16 for enabling cancellation of leakage currents flowing in the conduits 11 and 13 and ground. The dotted lines between the oscillator OSC and the driver coil 16 and between the pick-up coil 9 and the voltmeter merely indicate that, if desired, impedance matching and other components may be introduced into the electrical circuit at these locations in a manner well known in the art. For simplification, 8 is shown as a single variable resistor. However, resistor 8 may be any device which will vary the currents through either coil 16 and/or coil 18 to achieve the necessary balance and cancellation of leakage currents.

A temperature sensitive resistive element T is immersed in the solution flowing through the tubular loop, as by being inserted into a well or hole in the loop, so as to be in thermal contact with the electrolyte solution or slurry flowing through the loop. Element T may be a thermistor embedded in glass and electrically connected to a resistor network N so as to make the temperature coefficient of the conductance of the combination T and N equal to the temperature coefficient of conductance of the material or solution present in the loop 10. The resistor network may be located physically within the transmitter and it, together with the active temperature sensing element, may serve as a gain control of the oscillator signal sent to a buffer amplifier before being applied to toroidal coil 16.

The operation of the apparatus of the invention will now be given. A sample of the solution under pressure is caused to flow into the loop from metallic pipe 12 or 14 and is withdrawn from the loop by pipe 14 or 12, respectively, or vice versa, thereby causing a flow of solution in the closed tubular loop. One or more baffles of insulation, not shown, may suitably be positioned in the loop to eliminate any possibility of stagnation and to assure a continuous mixing of material and flow of solution through the loop. The alternating currents supplied to both driver or input toroidal coils 16 and 18 set up electrical currents $i_1$ and $i_2$ in the electrolyte solution which flow through the loop in the directions of the arrows shown in FIG. 2 within the tubular loop. It should be noted that current $i_1$ set up by driver coil 16 and current $i_2$ set up by driver coil 18 flow counter-clockwise in the same direction within the loop or dough-nut construction, but in opposite directions within the inlet and outlet conduits 11 and 13. The oppositely flowing currents in conduits 11 and 13 cancel each other. The currents $i_1$ and $i_2$ flowing in the same direction within the loop itself are additive and set up an alternating field in the pick-up toroidal coil 9 which causes a voltage to be generated therein in proportion to the conductivity of the electrolyte or material in the solution. The magnitude of the voltage generated in pick-up toroidal coil 9 is detected in the vacuum tube voltmeter VTVM, when the double-pole double throw switch 15 is thrown to the right.

In making the actual measurements, the switch 15 is first thrown to the left so as to connect the vacuum tube voltmeter VTVM to toroidal coil 7. If any measurement is detected by VTVM, the balance control resistor 8 is adjusted or varied until their is no measurement of current in the conduit 11 by VTVM. Such an absence of measurement by VTVM indicates that the ground leakage current $i_1$ induced by coil 16 and flowing in conduit 11 is canceled by the oppositely flowing ground leakage current $i_2$ induced by coil 18 and flowing in conduit 11. When this balance condition is reached, the DPDT switch 15 is thrown to the right to connect VTVM to toroidal coil 9. The vacuum tube voltmeter now measures the current flowing around the loop. If desired, the vacuum tube voltmeter may be replaced by a transducer which converts the picked-up alternating current signal to a direct current signal proportional to the input A.C., after which the direct current signal is fed to an indicating meter with a scale reading or to any suitable recorder.

The cancellation of the currents $i_1$ and $i_2$ in the conduits 11 and 13 completely eliminates any errors in measurements due to leakage current between metallic pipes 12 and 14 through ground.

The toroidal coils 7, 9, 16 and 18 each contain a core of good quality magnetic material preferably of high permeability upon which the coils are wound. The cores may, if desired, by ferrites. It is preferred that the driver or input cores be of identical construction.

Although it is preferred to use a non-magnetic and non-conductive material for the tubular closed loop assembly, such as Teflon or polyvinyl chloride, for example, the loop assembly may use other materials which are conducting and even magnetic, such as insulation-covered steel piping, provided the conductivity of the piping is less than the conductivity of the solution or materials in solution which are to be measured.

The present invention provides a true electrodeless system which eliminates problems in ground connections from showing up in the measurements of the electrical conductivity of solutions.

The term "solution" used in the appended claims is deemed to include any liquid, sludge, slurry, mud, oil, and mixtures thereof with or without solids, and which can be made to flow through a conduit. The solution may be quiescent or flowing. Its state of motion is not important to the practice of the invention. However, for the control of chemical processes, a flowing system may be more useful.

What is claimed is:

1. The method of determining the conductivity of an electrically conducting solution, which comprises introducing said solution into a tubular loop which is closed on itself at a first point thereon, withdrawing said solution from a second point on said loop which is spaced from the first point at which said solution is introduced into said loop, inducing the flow of alternating currents in said solution from two substantially oppositely disposed regions surrounding different portions of said tubular loop located between said aforesaid two points, and generating a voltage in response to the flow of said alternating currents in said solution in another region surrounding another portion of said tubular loop, but also located between said first two points.

2. The method of determining the conductivity of an electrically conducting solution, which comprises introducing said solution into a tubular loop which is closed on itself by a conduit, withdrawing said solution from said loop at a point thereon which is spaced from the point at which said solution is introduced into said loop by another conduit, inducing the flow of alternating currents in said solution from a pair of spaced regions surrounding different portions of said tubular loop located between the aforesaid two points, measuring the flow of leakage currents in at least one of said conduits, adjusting the intensities of the alternating currents induced in said solution at the said regions until there is cancellation of said leakage currents in said conduits, and generating a voltage in response to the flow of said alternating currents in said solution in another region surrounding another portion of said tubular loop but also located between said conduits.

3. Apparatus for measuring the conductivity of a solution comprising a tubular loop which is closed on itself and through which said solution can flow, a first toroidal coil surrounding a region on said loop, a second toroidal coil surrounding another region on said loop but spaced from said first region, a stable alternating current oscillator coupled to both of said toroidal coils, a conduit for introducing the solution to be investigated into said loop at a point between said two toroidal coils, a second conduit for withdrawing said solution from said loop at another point on said loop located opposite said first point relative to said two toroidal coils and also positioned between said two toroidal coils, means between said toroidal coils and said oscillator for adjusting the relative intensities of the current supplied by said oscillator to said coils, a third toroidal coil surrounding still another region of said loop for generating a voltage in proportion to the conductivity of the solution in said loop, and a fourth toroidal coil surrounding one of the above mentioned conduits connected to a detection circuit for determining the amount of the leakage currents in the conduits.

4. Apparatus according to claim 3, including means for compensating for changes in temperature of said solution, said means comprising a temperature sensitive element inserted into said loop and adapted to be in thermal contact with said solution, and a resistor network connected to said element and so constructed and arranged as to make the temperature coefficient of conductance of the combination of said element and network equal to the temperature coefficient of conductance of the solution within the loop.

5. Apparatus for measuring the conductivity of a solution, comprising a tubular loop of insulation material which is closed on itself and through which said solution can flow, a first input toroidal coil surrounding a region on said loop, a second input toroidal coil surrounding another region on said loop but spaced from said first region, a stable alternating current oscillator coupled to both of said toroidal coils, means for varying the relative magnitudes of the currents supplied by said oscillator to said coils in order to cancel out leakage currents flowing outside said loop, means for introducing the solution to be investigated into said loop at a point between said two input toroidal coils, and means for withdrawing said solution from said loop at another point on said loop located opposite said first point relative to said two toroidal coils and also positioned between said two toroidal coils, a third toroidal coil surrounding another region of said loop for generating a voltage in proportion to the conductivity of the solution in said loop, and means for compensating for a change in temperature of said solution, said last means comprising a temperature sensitive element inserted into said loop and adapted to be in thermal contact with said solution.

6. Apparatus according to claim 5, including a fourth coil located outside said tubular loop and near said first point and through which said solution is adapted to pass, and a detection circuit for alternate connection to said third and fourth coils to determine when the relative magnitudes of the currents supplied by the oscillator to the first and second toroidal coils are properly adjusted to cancel out leakage currents.

7. Apparatus for measuring the conductivity of a solution, comprising a tubular loop which is closed on itself and through which said solution can flow, a first toroidal coil surrounding a portion on said loop, second toroidal coil surrounding another portion on said loop but spaced from said first portion, a stable alternating current oscillator coupled to both of said toroidal coils, means for varying the relative magnitudes of the currents supplied by said oscillator to said coils, a conduit for introducing the solution to be investigated into said loop at a point on said loop between said two toroidal coils, another conduit for withdrawing said solution from said loop at another point on said loop located opposite said first point relative to said two toroidal coils and also positioned between said two coils, means including a coil surrounding another portion of said loop for measuring the current flowing in said loop, and metallic grounded inlet and outlet pipes respectively communicating with said conduits.

8. Apparatus according to claim 7, including a fourth toroidal coil located near said first point and through which said solution is adapted to pass, and a detection circuit adapted to be coupled thereto for determining when the relative magnitudes of the currents suppled by the oscillator to both said first and second toroidal coils are properly adjusted to cancel out leakage currents outside said loop.

References Cited
UNITED STATES PATENTS 2,542,057   2/1951   Relis _____ 324—30

RUDOLPH V. ROLINEC, *Primary Examiner.*

C. F. ROBERTS, *Assistant Examiner.*